(12) United States Patent
Farinas et al.

(10) Patent No.: US 7,528,364 B2
(45) Date of Patent: May 5, 2009

(54) OPTICAL BEAM STEERING AND SAMPLING APPARATUS AND METHOD

(75) Inventors: Alejandro D. Farinas, Mountain View, CA (US); Evan D. Green, San Jose, CA (US)

(73) Assignee: Bookham Technology PLC, Northamptonshire (GB)

(*) Notice: Subject to any disclaimer, the term of this patent is extended or adjusted under 35 U.S.C. 154(b) by 18 days.

(21) Appl. No.: 11/649,952

(22) Filed: Jan. 4, 2007

(65) Prior Publication Data

US 2007/0171624 A1 Jul. 26, 2007

Related U.S. Application Data

(60) Provisional application No. 60/760,521, filed on Jan. 20, 2006.

(51) Int. Cl.
*G02B 6/26* (2006.01)
(52) U.S. Cl. ............................ 250/236; 250/235; 385/16
(58) Field of Classification Search ............ 250/227.26, 250/201.9, 235, 236; 359/846, 849, 900, 359/555–557; 356/138, 152.1, 124
See application file for complete search history.

(56) References Cited

U.S. PATENT DOCUMENTS

| | | | |
|---|---|---|---|
| 5,745,309 A | 4/1998 | Salmon | |
| 5,893,076 A | 4/1999 | Hafner et al. | |
| 6,014,206 A | 1/2000 | Basting et al. | |
| 6,253,027 B1 | 6/2001 | Weber et al. | |
| 6,819,815 B1 * | 11/2004 | Corbalis et al. | 385/16 |
| 2001/0047387 A1 | 11/2001 | Brockhurst | |
| 2002/0026434 A1 | 2/2002 | Krebs et al. | |
| 2004/0041076 A1 * | 3/2004 | Atmur | 250/206.1 |

FOREIGN PATENT DOCUMENTS

| | | |
|---|---|---|
| JP | 11-295819 A | 10/1999 |
| WO | WO-98/33125 A1 | 7/1998 |
| WO | WO-00/57311 A2 | 9/2000 |
| WO | WO-00-57311 A3 | 9/2000 |

OTHER PUBLICATIONS

International Search Report and Written Opinion mailed on Mar. 17, 2008, for PCT Application No. PCT/US2007/000214 filed on Jan. 4, 2007, eight pages.
Grafström, S. et al. (Jan. 15, 1988). "Fast Laser Beam Position Control with Submicroradian Precision," *Optics Communication* 65(2):121-126.
Press Release. (Jan. 16, 2002). "TIBCO Software Extends Business Integration Leadership with Web Services Strategy," located at <http://www.tibco.com/company/news/release/press456.jsp>, last visited Sep. 21, 2005, 2 pages.

(Continued)

*Primary Examiner*—Georgia Y Epps
*Assistant Examiner*—Tony Ko
(74) *Attorney, Agent, or Firm*—Morrison & Foerster LLP

(57) ABSTRACT

In a light (optical) beam steering/sampling system, a matrix inversion control technique is used to decouple the operation of the actuators which drive the steering mirrors. The control technique uses two virtual variables, each having an associated independent feedback loop operating in a non-cross-coupled manner, each variable being associated with one of the two steering mirrors.

22 Claims, 3 Drawing Sheets

OTHER PUBLICATIONS

Press Release. (May 6, 2002). "TIBCO Software Announces Integration Platform for Secure Web Services," located at <http://www.tibco.com/company/news/release/press504.jsp>, last visited Sep. 21, 2005, 3 pages.

TIBCO Software, Inc. (2003). "TIBCO BusinessPartner," Product Description, TIBCO Software, Inc., 2 pages.

TIBCO Software, Inc. (2005). "Business-To-Business Integration," located at <http://www.tibco.com/software/business_integration/b2b_integration.jsp?m=c9>, last visited Sep. 21, 2005, 2 pages.

TIBCO Software, Inc. (2005). "TIBCO BusinessConnect™ 5.2," Product Description, TIBCO Software, Inc., 2 pages.

TIBCO Software, Inc. (2005). "TIBCO BusinessConnect™," located at <http://www.tibco.com/software/business_integration/businessconnect.jsp>, last visited Sep. 21, 2005, 2 pages.

TIBCO Software, Inc. (2005). "TIBCO BusinessPartner™," located at <http://www.tibco.com/software/business_integration/businesspartner.jsp>, last visited Sep. 21, 2005, one page.

TIBCO Software, Inc. (2005). "TIBCO PartnerExpress™," located at <http://www.tibco.com/software/business_integration/partnerexpress.jsp>, last visited Sep. 21, 2005, 2 pages.

TIBCO Software, Inc. (2005). "TIBCO® DataExchange," Product Description, TIBCO Software, Inc., 2 pages.

Udell, J. (Sep. 13, 2002). "Web Services Applications," InfoWorld article located at <http://www.infoworld.com/articles/fe/xml/02/09/16/020916feintro.html>, last visited Dec. 18, 2006, five pages.

International Preliminary Report on Patentability mailed on Jul. 31, 2008 for PCT Application No. PCT/US2007/000214, filed on Jan. 4, 2007, six pages.

* cited by examiner

OPTICAL BEAM STEERING AND SAMPLING APPARATUS AND METHOD

CROSS REFERENCE TO RELATED APPLICATION

This application claims priority to U.S. provisional application No. 60/760,521 filed Jan. 20, 2006, incorporated herein by reference in its entirety.

FIELD OF THE INVENTION

This disclosure relates in general to the field of optics and more particularly to a method and apparatus for control of an optical system.

BACKGROUND

It is well known in the optics field to control electromagnetic beams, typically light beams. It is often necessary to sample a portion of a light beam for subsequent control purposes. This typically involves some sort of detector and a feedback loop. Beams are typically detected in terms of their displacement and angle. In the prior art, for instance, to control the beams the lenses present in such a system are sometimes used in conjunction with steering mirrors. Typically, for instance, there are two steering mirrors in the system and two detectors. In one known system it is arranged so that one detector only observes changes in the beam due to the tilt of the first steering mirror. But then it has been found that it is impossible to make the second detector output signal dependent only upon the tilt of the second steering mirror. In other words, this arrangement has undesirable in terms of feedback, making the feedback complicated and almost impossible to eliminate all cross coupling. For example, when a position or angle change occurs to the input light beam which is captured by a non-zero reading from the first detector with a reading of the second detector remaining unchanged, the first steering mirror will have to be moved to eliminate the non-zero reading. This leads to an angle change in the output beam which will be detected in the second detector leading to a correction signal applied to the second mirror. Even if the system is carefully tuned so as to be stable, changes in the relative locations of the steering mirrors and detectors require a complete re-tuning, and may even result in configurations for which no stable tuning is possible. In particular, the arrangement in which one detector only observes changes due to tilt of one steering mirror is only possible at one unique distance between steering mirror and detector, based on the focal length of an interposed lens. This is generally a complicated system and it has undesirably proven almost impossible to eliminate all its error, or to be re-configured in fielded applications which require variation in the optical layout.

SUMMARY

In accordance with this invention a matrix inversion control technique is used to decouple the operation of the actuators which drive the steering mirrors in a beam steering/sampling system. Decoupling of the steering mirror actuators allows further for a calibration technique to identify physical configurations and a reconfigurable method. The calibration further allows for a fixed sampling module which samples the position of the optical beam at locations arbitrarily positioned relative to the actuators. Thus, by using the matrix inversion to decouple the control, a system with the possibility of eliminating almost all error is provided both by factory adjustment, and later if needed, by calibration on site.

In accordance with the present invention two virtual variables are constructed for purposes of feedback control, each variable having an associated independent feedback loop operating in a non-cross-coupled manner. Hence, each of these variables is respectively identified with one and only one of the steering mirrors so that the changes in the state (e.g., tilt) of one steering mirror do not affect the other variable. Hence, each feedback loop can operate independently. The virtual variables do not in general, correspond to beam pointing and displacement, although they can be used to calculate the pointing and displacement.

This system is applicable, for instance, to semiconductor manufacturing lithography equipment which typically provides light in the form of ultraviolet to expose resist on a wafer. This is merely an exemplary application. The present system and method are applicable to manipulation of any type of collimated light including, for instance, laser (coherent) light but not so limited. The present method and apparatus are generally useful with optical systems having continuous or pulsed beams, ultraviolet to infrared wavelengths, large or small diameter light beams and varying system configurations. Exemplary applications include wavelength multiplexing and de-multiplexing, power splitting and monitoring, beam measurement and monitoring, laser cutting, machining or surgery, interferometry, and multi-port light management.

DETAILED DESCRIPTION

Figure 1:
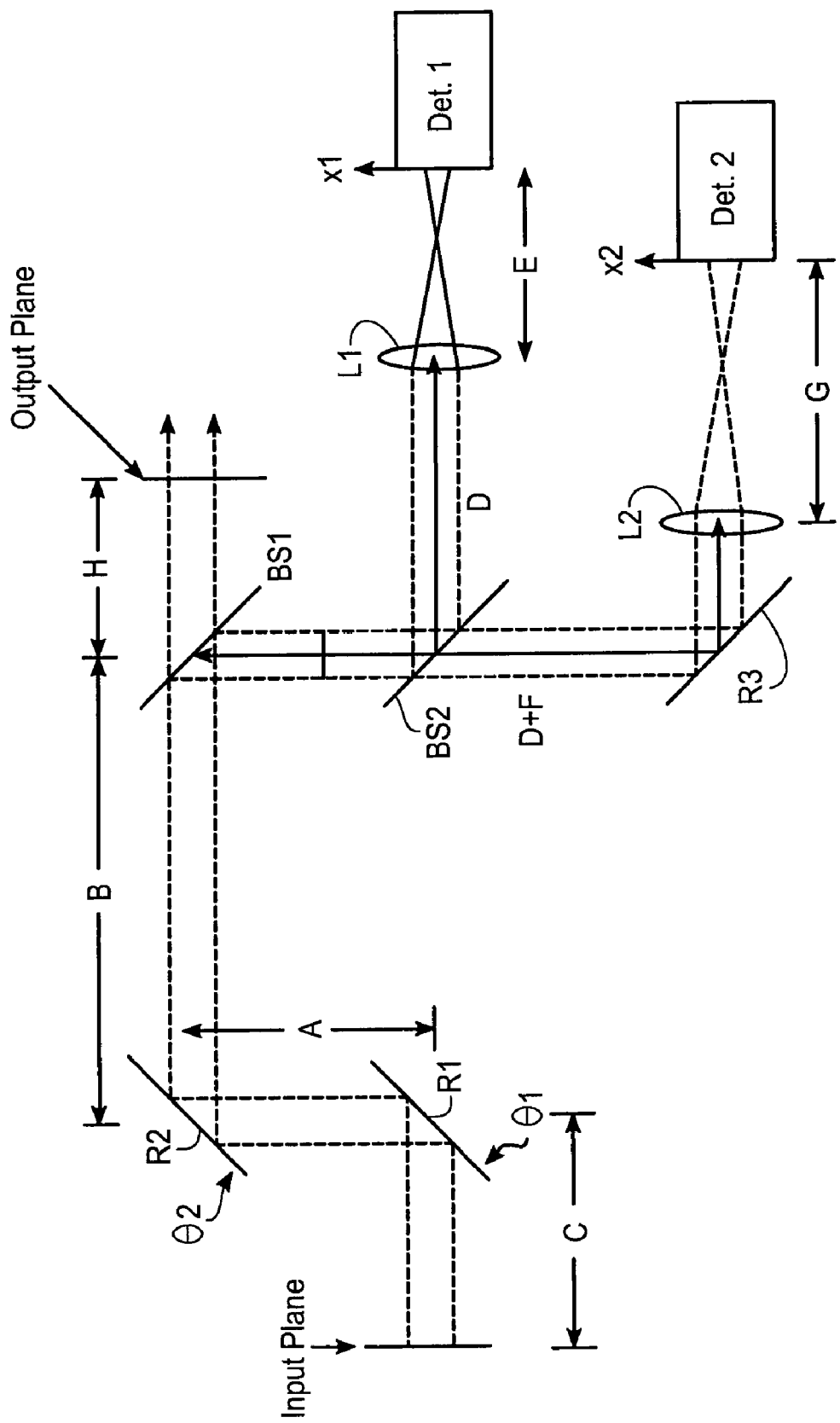
FIG. 1 shows in a block diagram an example of the present optical system.

The present beam steering sampling system, for one of the two controlled planes, is shown in FIG. 1. For instance, this depicts the system in the x-z plane. A control loop (not shown) including two additional actuators, one per steering mirror, and two additional detectors, is provided for similar control in the y-z plane. For simplicity, this description limits itself to one such plane, but extension to the other plane is routine and accomplished with the same method as described herein. All optical elements in FIG. 1 are conventional and suitably mounted on an optical bench or other support. In one embodiment the detectors Det1, Det2 are on a separate support from the other optical elements. In one embodiment Det1, Det2 are derived from the four quadrants of a conventional split quadrant photodetector. A position sensing photodectector or other type may also be used. The steering mirrors, each driven by a suitable precision actuator A1, A2 in the plane depicted in FIG. 1, are R1, R2. The input light beam (shown by parallel broken lines to depict its beam width) is at the input plane. There are provided beam splitters BS1, BS2. The main light beam (split off from the portion incident on the detectors) is supplied at the output plane. Mirror R3 is located to direct the light to detector Det2. Given the distances A, B, C, D, E, F, G, and H defined in FIG. 1 (where D is the distance between beam splitter BS1 and focusing lens L1 along the optic axis, and D+F is likewise the distance between beam splitter BS1 and focusing lens L2), the focal lengths of lens L1 and lens L2 $f_1$ and $f_2$ respectively, the mirror-angle to translation coupling coefficient $T \equiv dz/d\theta$, and the angles of the steering mirrors R1 and R2, $\theta_1$ and $\theta_2$, the position and angle respectively of the beam relative to the optic axis, $x_{out}$ and $\theta_{out}$, as a function of the beam input and beam angles, $x_{in}$ and $\theta_{in}$, is given by:

$$\begin{bmatrix} x_{out} \\ \theta_{out} \end{bmatrix} = \begin{bmatrix} 1 & A+B+C+H \\ 0 & 1 \end{bmatrix} \begin{bmatrix} x_{in} \\ \theta_{in} \end{bmatrix} + 2 \begin{bmatrix} A+B-T+H & B-T+H \\ 1 & 1 \end{bmatrix} \begin{bmatrix} \theta_1 \\ \theta_2 \end{bmatrix}$$

Similarly, the beam position $x_1$, $x_2$ at each of the two detectors' active elements is given by:

$$\begin{bmatrix} x_1 \\ x_2 \end{bmatrix} = \begin{bmatrix} \alpha_1 & \beta_1 \\ \alpha_2 & \beta_2 \end{bmatrix} \begin{bmatrix} x_{in} \\ \theta_{in} \end{bmatrix} + \begin{bmatrix} \gamma_1 & \delta_1 \\ \gamma_2 & \delta_2 \end{bmatrix} \begin{bmatrix} \theta_1 \\ \theta_2 \end{bmatrix},$$

where:

$$\alpha_1 \equiv 1 - \frac{E}{f_1},$$

$$\beta_1 \equiv A + B + C + D + E\left(1 - \frac{A+B+C+D}{f_1}\right),$$

$$\gamma_1 \equiv 2\left[A + B - T + D + E\left(1 - \frac{A+B-T+D}{f_1}\right)\right],$$

$$\delta_1 \equiv 2\left[B - T + D + E\left(1 - \frac{B-T+D}{f_1}\right)\right],$$

and:

$$\alpha_2 \equiv 1 - \frac{G}{f_2},$$

$$\beta_2 \equiv A + B + C + D + F + G\left(1 - \frac{A+B+C+D+F}{f_2}\right),$$

$$\gamma_2 \equiv 2\left[A + B - T + D + F + G\left(1 - \frac{A+B-T+D+F}{f_2}\right)\right],$$

$$\delta_2 \equiv 2\left[B - T + D + F + G\left(1 - \frac{B-T+D+F}{f_2}\right)\right].$$

If one defines two new variables, u and v, such that:

$$\begin{bmatrix} u \\ v \end{bmatrix} = \frac{1}{\gamma_1 \delta_2 - \gamma_2 \delta_1} \begin{bmatrix} \delta_2 & -\delta_1 \\ -\gamma_2 & \gamma_1 \end{bmatrix} \begin{bmatrix} x_1 \\ x_2 \end{bmatrix}$$

$$= M1 \begin{bmatrix} x_1 \\ x_2 \end{bmatrix},$$

then:

$$\begin{bmatrix} u \\ v \end{bmatrix} = \frac{1}{\gamma_1 \delta_2 - \gamma_2 \delta_1} \begin{bmatrix} \alpha_1 \delta_2 - \alpha_2 \delta_1 & \beta_1 \delta_2 - \beta_2 \delta_1 \\ -\alpha_1 \gamma_2 + \alpha_2 \gamma_1 & -\beta_1 \gamma_2 + \beta_2 \gamma_1 \end{bmatrix} \begin{bmatrix} x_{in} \\ \theta_{in} \end{bmatrix} + \begin{bmatrix} 1 & 0 \\ 0 & 1 \end{bmatrix} \begin{bmatrix} \theta_1 \\ \theta_2 \end{bmatrix}$$

$$= \begin{bmatrix} M3A & M3B \\ M3C & M3D \end{bmatrix} \begin{bmatrix} x_{in} \\ \theta_{in} \end{bmatrix} + \begin{bmatrix} 1 & 0 \\ 0 & 1 \end{bmatrix} \begin{bmatrix} \theta_1 \\ \theta_2 \end{bmatrix}$$

and one can control u with $\theta_1$ with no interference from $\theta_2$. Similarly, one can control v with $\theta_2$ with no interference from $\theta_1$. Hence u, v are two virtual variables with no cross coupling for control by two steering mirrors.

Figure 2:
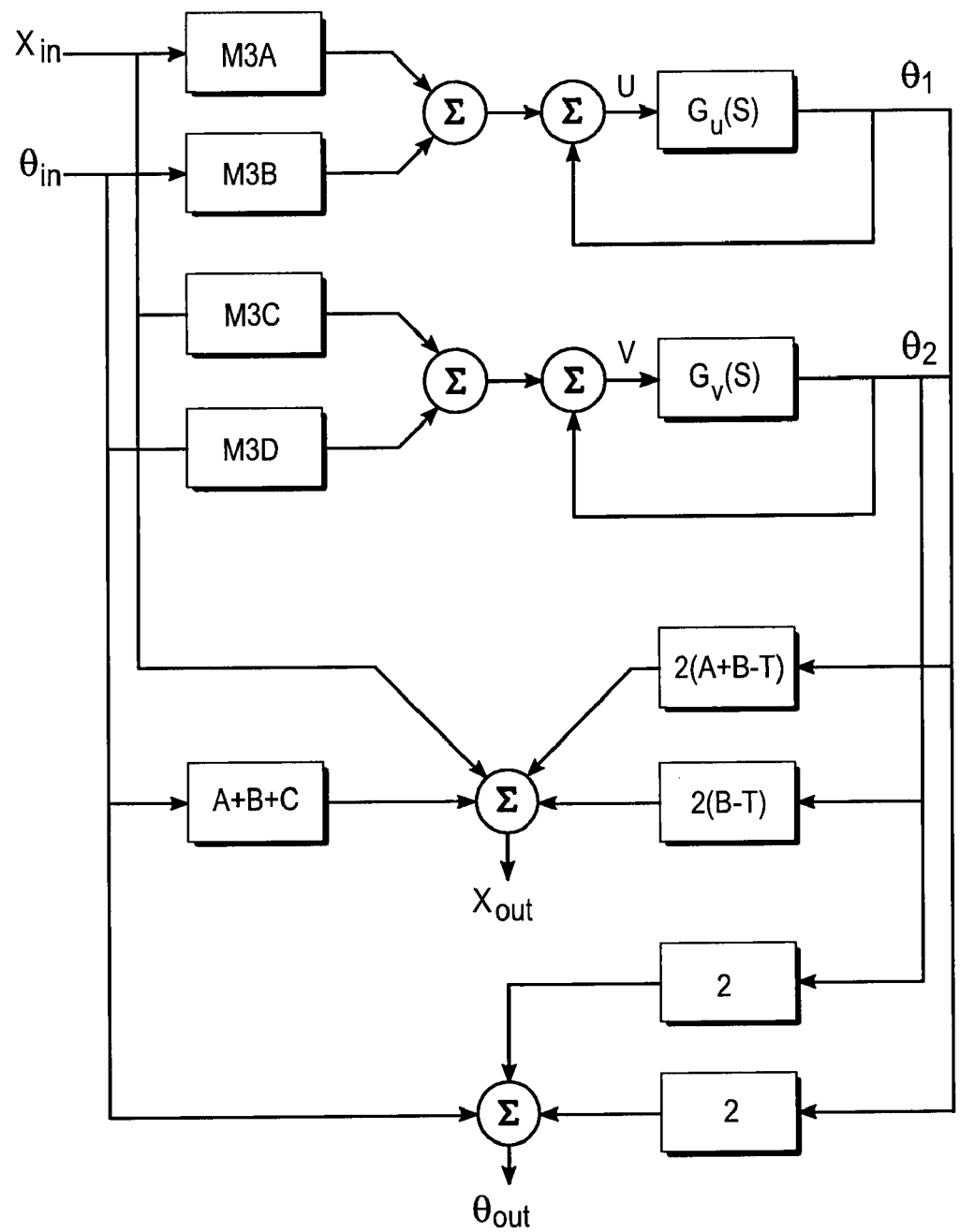
FIG. 2 shows in a block diagram the feedback control method for the two feedback loops.

The equations above correspond to the control system block diagram shown in FIG. 2. The control system of FIG. 2 receives as input the beam parameters $x_{in}$, $\theta_{in}$. This control system may be conventionally embodied in analog electronic circuitry or digitally by a conventionally programmed microprocessor or microcontroller. Programming such a device is routine in light of this disclosure. Each block or node in FIG. 2 represents a function with the nodes being summing nodes. The control output signals $\theta_1$ and $\theta_2$ are conventionally transmitted by the control system to drive the steering mirror actuators, thus providing closed-loop feedback control. For control loop gains $G_u(s)$ and $G_v(s)$ much greater than one, $u = v \approx 0$ and $x_{out} = \theta_{out} \approx 0$ for any $x_{in}$ and $\theta_{in}$.

In another embodiment, the control loop is implemented using the following method. The reflecting mirror angle changes required to correct for the error in beam position are given by:

$$\begin{bmatrix} \Delta \theta_1 \\ \Delta \theta_2 \end{bmatrix} = -M1 \begin{bmatrix} x_1 \\ x_2 \end{bmatrix} + \begin{bmatrix} u_{offset} \\ v_{offset} \end{bmatrix},$$

where the offset (setpoint) values are given by:

$$\begin{bmatrix} u_{offset} \\ v_{offset} \end{bmatrix} = \frac{1}{2A} \begin{bmatrix} -1 & B+H \\ 1 & A+B+H \end{bmatrix} \begin{bmatrix} x_{offset} \\ \theta_{offset} \end{bmatrix},$$

where $x_{offset}$ and $\theta_{offset}$ are the desired beam position and pointing at the output plane. The maximum values of these offsets will be limited by the detectors' usable sensing range. The mirror R1, and R2 angle changes (tilt) are converted into an estimated number of actuator driving pulses as given by $P\# = kL \Delta\theta / k\#$, where kL is a global gain constant that is used to speed up or slow down the loop, # is a placeholder for the appropriate actuator, and k# is that actuator's gain constant relating the actuator position to the signal applied to the actuator driver.

The main sources of error in this beam sampling system are for example: shot- and Johnson-noise of the position-sensitive detectors Det1, Det2, quantization error in the conventional analog to digital converter (not shown) used to digitize the detectors' output signals, physical misalignment of the beam sampling system as temperature changes, and the smallest incremental motion of the actuators A1, A2 which are driving mirrors R1, R2. All of these error sources can be easily referred back to $x_1$ and $x_2$ where they will be injected into the u and v summing nodes with gains:

$$\frac{du}{dx_1} = \frac{1}{2A} \frac{B-T+D+F+(1+M_2)(f_2-A-B+T-D-F)}{M_2 f_1 - M_1 f_2 + M_1 M_2 (f_1 - f_2 + F)},$$

$$\frac{du}{dx_2} = -\frac{1}{2A} \frac{B-T+D+(1+M_1)(f_1-A-B+T-D)}{M_2 f_1 - M_1 f_2 + M_1 M_2 (f_1 - f_2 + F)},$$

$$\frac{dv}{dx_1} = -\frac{1}{2A} \frac{A+B-T+D+F+(1+M_2)(f_2-A-B+T-D-F)}{M_2 f_1 - M_1 f_2 + M_1 M_2 (f_1 - f_2 + F)},$$

$$\frac{dv}{dx_2} = \frac{1}{2A} \frac{A+B-T+D+(1+M_1)(f_1-A-B+T-D)}{M_2 f_1 - M_1 f_2 + M_1 M_2 (f_1 - f_2 + F)}.$$

Assuming equal and independent fluctuation in $x_1$ and $x_2$, $\delta x$, the fluctuations in the output beam position and angle, $\delta x_{out}$ and $\delta \theta_{out}$, are given by:

$$\delta x_{out} = 2 \sqrt{\left[(A+B-T)\frac{du}{dx_1} + (B-T)\frac{dv}{dx_1}\right]^2 + \left[(A+B-T)\frac{du}{dx_2} + (B-T)\frac{dv}{dx_2}\right]^2} \, \delta x,$$

$$\delta \theta_{out} = 2 \sqrt{\left[\frac{du}{dx_1} + \frac{dv}{dx_1}\right]^2 + \left[\frac{du}{dx_2} + \frac{dv}{dx}\right]^2} \, \delta x.$$

The actuators' A1, A2 minimum step size, $\delta z_{pico}$ leads to an output error given by:

$$\delta x_{out} = 2(A + B - T)\frac{\delta z_{pico}}{d_{MM}},$$

$$\delta \theta_{out} = 2\sqrt{2}\frac{\delta z_{pico}}{d_{MM}},$$

where $d_{MM}$ is the lever arm between the actuator's screw and the center of the optic. The actuators are, e.g., screw driven such as the Picomotor™, a piezoelectric actuator sold by New Focus Inc. Finally, the output is sensitive to twisting and translation of components BS1, BS2, R3, L1, L2, Det1, and Det2. Assuming a uniform temperature of the beam sampling system, these errors will be negligible. The beam does, however, translate a distance $dB_S$ by passing through each of beam splitters BS1 and BS2 given by:

$$d_{BS} = t_{BS}\sin\phi\left(1 - \frac{\cos\phi\sin\phi}{n_{FS}\sqrt{n_{FS}^2 - \sin^2\phi}}\right),$$

where $t_{BS}$ is the thickness of each beamsplitter, $\phi$ is the beam angle of incidence, and $n_{FS}$ is the index of refraction of the material of the beam splitters. This translation changes as the ambient temperature changes by:

$$\frac{d d_{BS}}{dT} = d_{BS}\alpha_{FS} + \frac{t_{BS}\cos\phi\sin^2\phi}{\sqrt{n_{FS}^2 - \sin^2\phi}}\left(\frac{1}{n_{FS}^2} + \frac{1}{n_{FS}^2 - \sin^2\phi}\right)\frac{dn_{FS}}{dT},$$

where $\alpha_{FS}$ is the thermal expansion coefficient of the material of the beam splitters, leading to an error of:

$$\delta x_{out} = \left[1 + 2(A + B - T)\frac{du}{dx_2} + 2(B - T)\frac{dv}{dx_2}\right]\frac{d d_{BS}}{dT}\Delta T,$$

$$\delta \theta_{out} = 2\left(\frac{du}{dx_2} + \frac{dv}{dx_2}\right)\frac{d d_{BS}}{dT}\Delta T.$$

for a peak system temperature change $\Delta T$.

The matrix transformation that relates $x_1$ and $x_2$ to u and v can be set at the time of manufacture of the system, but even small variations in assembly will introduce large cross coupling between the feedback loops. Therefore, an in situ calibration procedure may be used but is not required. Calibration begins by zeroing both $x_1$ and $x_2$ (or at least verifying that the beam is in the linear range of the position detectors Det1, Det2), and applying a given angle change to each steering mirror R1, R2 respectively, $\Delta\theta_1$ and $\Delta\theta_2$. The control system will record four quantities: $\Delta x_{11}$ the change in $x_1$ due to a change in $\theta_1$, $\Delta x_{21}$ the change in $x_2$ due to a change in $\theta_1$, $\Delta x_{12}$ the change in $x_1$ due to a change in $\theta_2$, $\Delta x_{22}$ the change in $x_2$ due to a change in $\theta_2$. Now the calibration matrix can be computed by noting that:

$$\gamma_1 = \frac{\Delta x_{11}}{\Delta \theta_1},$$

$$\delta_1 = \frac{\Delta x_{12}}{\Delta \theta_2},$$

$$\gamma_2 = \frac{\Delta x_{21}}{\Delta \theta_1},$$

$$\delta_2 = \frac{\Delta x_{22}}{\Delta \theta_2},$$

and as above:

$$\begin{bmatrix} u \\ v \end{bmatrix} = \frac{1}{\gamma_1\delta_2 - \gamma_2\delta_1}\begin{bmatrix} \delta_2 & -\delta_1 \\ -\gamma_2 & \gamma_1 \end{bmatrix}\begin{bmatrix} x_1 \\ x_2 \end{bmatrix}.$$

The calibration process can incorporate filtering, i.e. changing the angles multiple times and averaging the results, and recursion, i.e. using the feedback loop to zero u and v in between calibration attempts.

Figure 3:
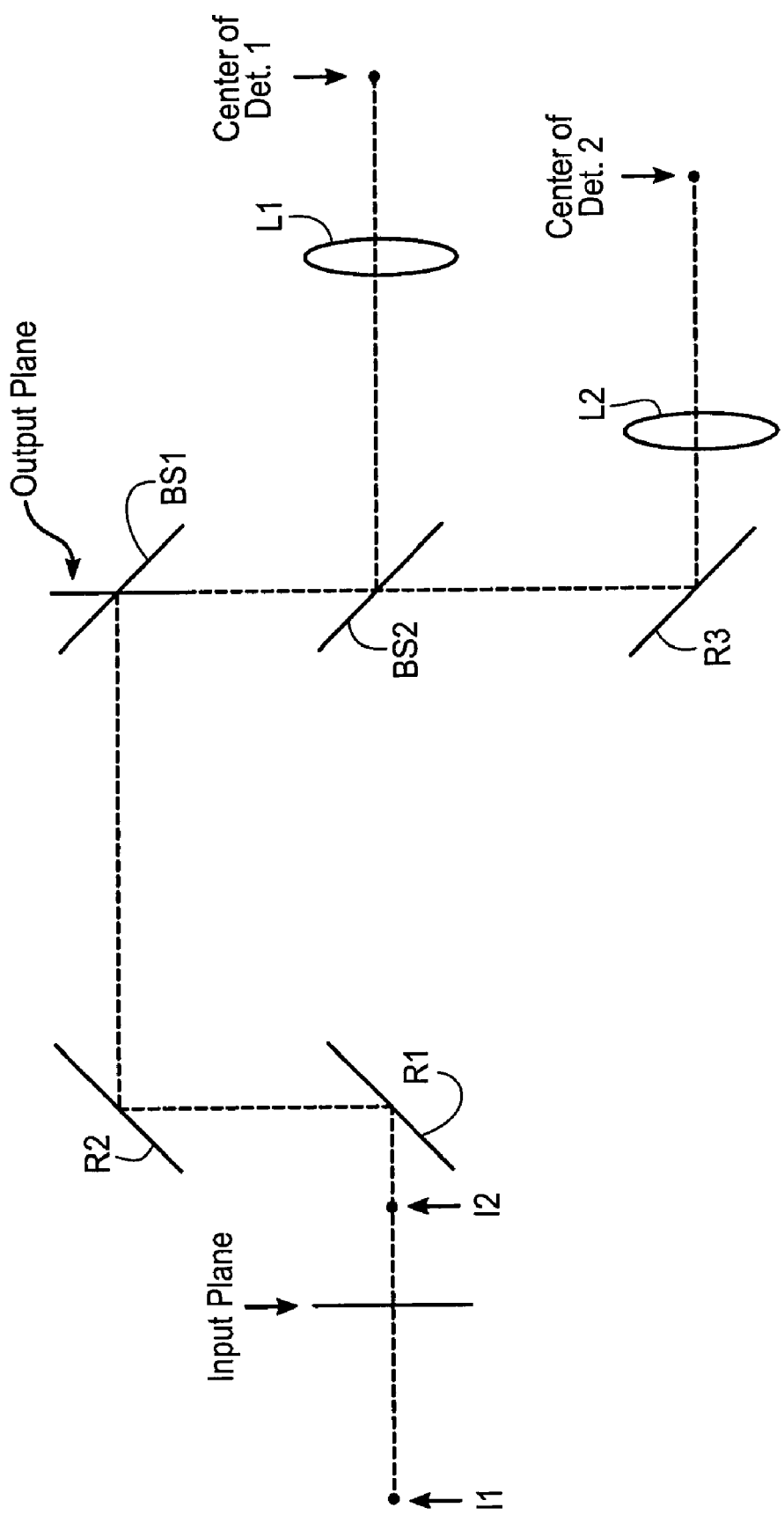
FIG. 3 shows the optical axis of the FIG. 1 system.

Once the system is installed and aligned, and with the position and angle offsets set to zero, the output beam will be driven toward the optical axis, $x_{out}=\theta_{out}=0$. The optical axis is defined by the physical position of the detectors Det1, Det2, as imaged by the lenses L1, L2, and is shown in FIG. 3. FIG. 3 shows the optical axis is defined as the line running through the image of each of the two detectors' centers, $I_1$ and $I_2$. Given an alignment tolerance $\Delta x_{align}$ on the relative position of the lenses and detectors, the position of the beam images will be displaced by $\Delta I_1 = \Delta x_{align}/M$ and $\Delta I_2 = \Delta x_{align}/M$, where it is assumed that magnification $M = M_1 = M_2$. These displacements will lead to a maximum position and angle variation at the output plane, $\Delta x_{axis}$ and $\Delta\theta_{axis}$, given by:

$$\Delta x_{axis} = \frac{\Delta x_{align}}{M} - \left[A + B + C - f_1\left(1 + \frac{1}{M}\right)\right]\Delta\theta_{axis},$$

$$\Delta\theta_{axis} = -\frac{2\Delta x_{align}}{(1 + M)(f_1 - f_2)}.$$

The present system and control signal processing result in two independent feedback loops that meet high performance requirements. The above field calibration can be performed after installation and periodically thereafter.

This disclosure covers control in two axes (one axis on each of two steering mirrors). The process underlying the third and fourth axes of a beam pointing and translation system (the second axis on each of the two steering mirrors) is identical. The overall effect is to generate two simultaneous control loops for u1, v1 and u2, v2 for both of the tip-tilt axes of the steering mirrors. In this disclosure the actuators A1, A2 are shown as being arranged to be in parallel, but this is not limiting. The above calibration process and/or software control of the actuators can be employed to map the actuators (two, or four including those for the second axis of the steering mirrors) to each of the four control variables u1, v1 and u2, v2.

This disclosure is illustrative but not limiting; further modifications will be apparent to one skilled in the art in light of this disclosure and are intended to fall within the scope of the appended claims.

The invention claimed is:

1. Apparatus comprising:
   a first steering reflector on which a beam of light is incident;

a second steering reflector on which light reflected from the first steering reflector is incident;

a first beam splitter on which light reflected from the second steering reflector is incident;

a second beam splitter on which light reflected from the first beam splitter is incident;

a first detector on which light reflected from the first beam splitter is incident; and a second detector on which light transmitted by the second beam splitter is incident;

wherein a first value is obtained which is a function of an output signal of both detectors is indicative of a state of the first steering reflector and not of the second steering reflector, and a second value is obtained which is a function of an output signal of both detectors is indicative of a state of the second steering reflector and not of the first steering reflector.

2. The apparatus of claim 1, further comprising a controller coupled between the detectors and the steering reflectors, whereby the controller changes the state of the first steering reflector responsive to the first value and not the second value and changes the state of the second steering reflector responsive to the second value and not the first value.

3. The apparatus of claim 2, the controller including two control loops, one control loop being associated with each of the first and second values.

4. The apparatus of claim 2, wherein the controller includes means for calibrating the apparatus.

5. The apparatus of claim 1, each steering reflector including a reflector coupled to an actuator.

6. The apparatus of claim 5, each steering reflector having a second actuator coupled to the reflector to tilt the reflector in a direction substantially orthogonal to a direction in which the first actuator tilts that reflector.

7. The apparatus of claim 1, wherein light transmitted by the first beam splitter is directed out of the apparatus.

8. The apparatus of claim 1, further comprising a third reflector positioned to reflect the light transmitted by the second beam splitter to the second detector.

9. The apparatus of claim 1, wherein each of the first and second values is obtained as a function of a displacement and an angle of the light beam incident on the apparatus.

10. The method of claim 1, further comparing a first lens located to focus light onto the first detector and a second lens located to focus light onto the second detector.

11. The apparatus of claim 1, wherein the first value and the second value respectively do not correspond to pointing or displacement of the beam of light.

12. Method for operating an optical apparatus having two steering reflectors, comprising the acts of:

splitting light reflected serially from the two steering reflectors;

splitting the split light, into two portions;

detecting a first portion of the twice split light;

detecting a second portion of the twice split light;

obtaining a first value which is a function of an output signal from both acts of detecting, the first value being indicative of a state of the first steering reflector and not of the second steering reflector; and obtaining a second value which is a function of an output signal from both acts of detecting, the second value being indicative of a state of the second steering reflector and not of the first steering reflector.

13. The method of claim 12, further comprising the act of:

controlling a state of the first steering reflector responsive to the first value and not the second value, and controlling a state of the second steering reflector responsive to the second value and not the first value.

14. The method of claim 13, the controlling including:

providing two control loops, one control loop being associated with each of the first and second values.

15. The method of claim 12, further comprising the act of changing the state of each steering reflector by an actuator.

16. The method of claim 15, further comprising the act of providing a second actuator associated with each steering reflector to tilt the steering reflector in a direction substantially orthogonal to a direction in which the first actuator tilts that reflector.

17. The method of claim 12, further comprising the act of directing externally a portion of the light which is split from the first act of splitting.

18. The method of claim 12, further comprising the act of reflecting the second portion of the twice split light prior to the act of detecting same.

19. The method of claim 12, wherein each of the first and second values is obtained as a function of a displacement and an angle of incident light.

20. The method of claim 12, further comprising the act of calibrating the optical apparatus.

21. The method of claim 12, further comprising the act of focusing the light prior to detecting same.

22. The method of claim 12, wherein the two values respectively do not correspond to pointing or displacement of the light.

* * * * *